US012621285B2

(12) United States Patent
Kim et al.

(10) Patent No.: US 12,621,285 B2
(45) Date of Patent: May 5, 2026

(54) SYSTEMS AND METHODS FOR USING PARTIAL COOKIES FOR ELECTRONIC AUTHENTICATION AND AUTHORIZATION

(71) Applicant: Stripe, LLC, South San Francisco, CA (US)

(72) Inventors: Jiwon Kim, South San Francisco, CA (US); Jose Carlos Matias, South San Francisco, CA (US); Ernesto Carvajal Lastres, South San Francisco, CA (US); Suhas Hoskote Muralidhar, South San Francisco, CA (US)

(73) Assignee: STRIPE, LLC, South San Francisco, CA (US)

( * ) Notice: Subject to any disclaimer, the term of this patent is extended or adjusted under 35 U.S.C. 154(b) by 0 days.

(21) Appl. No.: 18/645,063

(22) Filed: Apr. 24, 2024

(65) Prior Publication Data

US 2025/0337724 A1     Oct. 30, 2025

(51) Int. Cl.
H04L 9/40          (2022.01)

(52) U.S. Cl.
CPC ........ H04L 63/0815 (2013.01); H04L 63/102 (2013.01); H04L 63/108 (2013.01)

(58) Field of Classification Search
CPC .. H04L 63/102; H04L 63/108; H04L 63/0815
See application file for complete search history.

(56) References Cited

U.S. PATENT DOCUMENTS 9,208,298 B2 * 12/2015 McCoy ................. H04L 63/083
12,231,417 B2 * 2/2025 Thubert ................ H04L 67/141

| 2004/0080529 A1 * | 4/2004 | Wojcik | G06F 21/36 |
| | | | 715/738 |
| 2022/0114245 A1 * | 4/2022 | Krishan | G06F 21/32 |
| 2024/0283657 A1 * | 8/2024 | Jose | H04L 9/3297 |
| 2024/0348695 A1 * | 10/2024 | Kannembath | G06F 16/9574 |
| 2025/0080570 A1 * | 3/2025 | Ramsue | H04L 63/102 |

OTHER PUBLICATIONS

Victoria Beltran, "Characterization of Web Single Sign-on protocols," 2016, pp. 24-30 (Year: 2013).*
Feng Yang, "A Security analysis of the OAuth protocol," 2013, pp. 1-6. (Year: 2013).*

* cited by examiner

*Primary Examiner* — Luu T Pham
*Assistant Examiner* — Canh Le
(74) *Attorney, Agent, or Firm* — Foley & Lardner LLP

(57)          ABSTRACT

The methods and systems disclosed herein allow for faster and more efficient authentication using a partial cookie instead of a full cookie (or other data structure). In one example, a server receives, during the first browser session at the first time, a first request for authorization from an electronic device along with authentication information. Responsive to generating a profile using the authentication information, the server transmits to the electronic device a first data source configured to grant access to the profile to the electronic device, via a first authentication protocol; and receives, at a second browser session at a second time, from the electronic device, a second request for authorization to access the profile; responsive to a determination that the electronic device includes the first data source, the server executes a secondary authentication protocol.

16 Claims, 5 Drawing Sheets

200A

200B

SYSTEMS AND METHODS FOR USING PARTIAL COOKIES FOR ELECTRONIC AUTHENTICATION AND AUTHORIZATION

TECHNICAL FIELD

This application relates generally to using data structures (e.g., cookies) for electronic authentication and authorization.

BACKGROUND

Systems often use cookies to capture extensive user data, including personal information, login credentials, browsing history, and interaction patterns. Full-data cookies offer enhanced customization and convenience for users by providing seamless authentication. As a result, many use cookies to mark an electronic device as safe or authorized to access various data records.

However, extensive data stored within full data cookies increases the risk of unauthorized access and misuse. For instance, a misplaced cookie (while ensuring easy access to the account for the right person) can also allow bad actors to have access to an account that is otherwise not accessible. Accordingly, if an entity uses cookies, the entity must ensure that the cookie is transmitted to the user's device correctly and at the right time. For instance, some entities transmit the cookie when the user has provided both a username and password to an account.

SUMMARY

For the aforementioned reasons, there is a desire for systems and methods to use cookies to ease the user's access to certain information (e.g., accessing an account). Using the methods and systems discussed herein, an entity can use partial cookies to expedite the login process while not compromising security. The methods and systems discussed herein allow for efficient and secure protection of user data, such that users are no longer required to enter their entire authentication information. Using partial cookies allows for securing the data of unverified users prior to using a full cookie (e.g., prior to receiving full authentication information). As used herein, the partial cookie may include any type of session IDs and basic browsing information that may be provided to secure the data of the user.

Using the systems and methods described herein, one or more processors (e.g., a server or cloud computer environment) can receive, during a first browser session at the first time, a request to authorize a payment from a computer, phone, tablet, or other computing device. The request may be, for example, a payment authorization request, a payment capture request, a payment funds request, or any other type of secure transaction. The one or more processors can receive authentication information corresponding to a user of the computing device.

The systems and methods described herein, can use the authentication information to generate a profile to secure any data of the user and transmit a partial cookie to the computing device to grant access to the profile via a first authentication protocol. The partial cookie can show redacted information of the profile to protect the data within the profile in the event that another user accesses the computing device. Because these techniques do not rely on conventional approaches for using partial cookies, the approaches described herein do not suffer from the memory and bandwidth constraints of conventional systems. Using the systems and methods described herein, the partial cookie can securely be distributed to the computing device and used to access the profile prior to verifying the user. Using the partial cookie in this manner does not require costly full cookie operations and is, therefore, more efficient with regard to time and computing resources.

In an embodiment, a system comprises one or more processors coupled with non-transitory memory. The one or more processors can receive, during a first browser session at a first time, a first request for authorization from an electronic device; receive authentication information associated with an end-user of the electronic device; responsive to generating a profile for the end-user using the authentication information, during the first browser session and prior to receiving the authentication information again, transmit to the electronic device a first data source configured to grant access to the profile via a first authentication protocol; receive, at a second browser session at a second time, from the electronic device, a second request for authorization to access the profile; responsive to a determination that the electronic device includes the first data source, transmit a first notification to an authorized device associated with the profile; and upon receiving a response to the first notification, transmit to the electronic device a second data source configured to grant access to the profile via a second authentication protocol.

In some embodiments, the one or more processors are further configured to generate the profile to store the authentication information associated with the end-user of the electronic device; and generate the first data source to grant access to the profile during the first browser session via the first authentication protocol. In some embodiments, the one or more processors are further configured to determine that the electronic device includes the second data source; and responsive to the determination that the electronic device includes the second data source, grant access to the profile via the second authentication protocol. In some embodiments, the first data source or the second data source is configured to grant access to the profile for a defined period of time.

In some embodiments, the one or more processors are further configured to embed a code within the notification, the code including a plurality of alphanumeric values. In some embodiments, the authentication information comprises at least one of an electronic mail address, credit card information, debit card information, a cardholder name, a phone number, or a region. In some embodiments, the one or more processors are further configured to identify a first attribute associated with the first request; identify a second attribute associated with the second request; when the first attribute does not match the second attribute, transmit a second notification to the electronic device indicating suspicious activity associated with the profile. In some embodiments, the one or more processors are further configured to when the first attribute does not match the second attribute, revoke the second data source. In some embodiments, the first attribute of the second attribute is one of at least a geographical location, internet protocol address of the electronic device, or an operating system of the electronic device. In some embodiments, the one or more processors are further configured to determine that the electronic device includes the first data source by retrieving the first data source from memory of the electronic device.

In an embodiment, a method comprises receiving, by one or more processors during a first browser session at a first time, a first request for authorization from an electronic device; receiving, by the one or more processors, authentication information associated with an end-user of the electronic device; responsive to generating a profile for the end-user using the authentication information, during the first browser session and prior to receiving the authentication information again, transmitting, by the one or more processors, to the electronic device a first data source configured to grant access to the profile via a first authentication protocol; receiving, by the one or more processors, at a second browser session at a second time, from the electronic device, a second request for authorization to access the profile; responsive to a determination that the electronic device includes the first data source, transmitting, by the one or more processors, a notification to an authorized device associated with the profile; and upon receiving a response to the notification, transmitting, by the one or more processors, to the electronic device a second data source configured to grant access to the profile via a second authentication protocol.

In some embodiments, the method comprises generating, by the one or more processors, the profile to store the authentication information associated with the end-user of the electronic device; and generating, by the one or more processors, the first data source to grant access to the profile during the first browser session, via the first authentication protocol. In some embodiments, the method comprises determining, by the one or more processors, that the electronic device includes the second data source; and responsive to the determination that the electronic device includes the second data source, granting, by the one or more processors, access to the profile, via the second authentication protocol.

In some embodiments, the first data source or the second data source is configured to grant access to the profile for a defined period of time. In some embodiments, the method comprises embedding, by the one or more processors, a code within the notification, the code including a plurality of alphanumeric values. In some embodiments, the authorization information comprises at least one of an electronic mail address, credit card information, debit card information, a cardholder name, a phone number, and a region. In some embodiments, the method comprises identifying, by the one or more processors, a first attribute associated with the first request; identifying, by the one or more processors, a second attribute associated with the second request; when the first attribute does not match the second attribute, transmitting, by the one or more processors, a second notification to the electronic device indicating suspicious activity associated with the profile.

In some embodiments, the method comprises when the first attribute does not match the second attribute, revoking, by the one or more processors, the second data source. In some embodiments, the first attribute of the second attribute is one of at least a geographical location, internet protocol address of the electronic device, or an operating system of the electronic device. In some embodiments, the method comprises determining, by the one or more processors, that the electronic device includes the first data source.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

DETAILED DESCRIPTION

Figure 1:
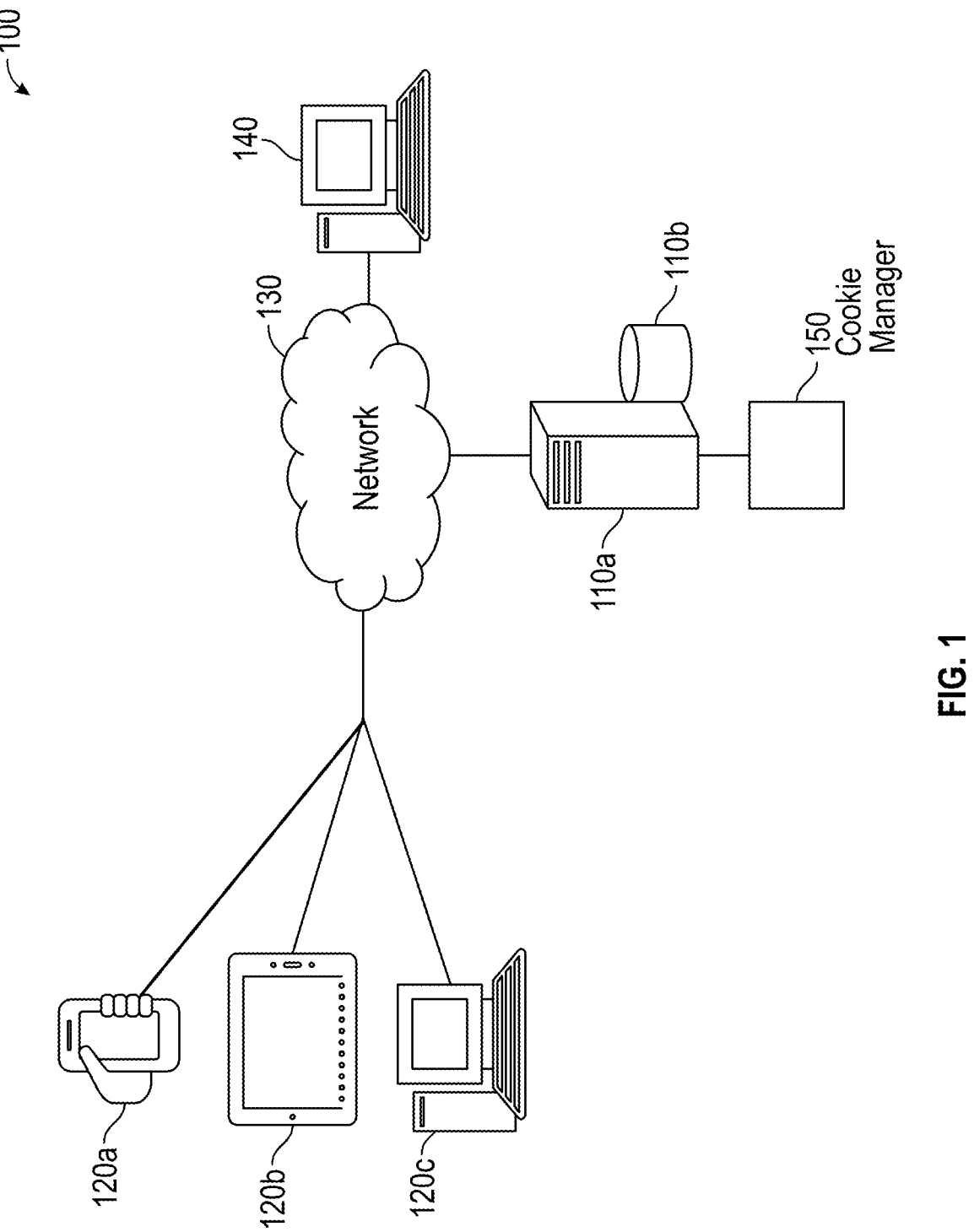
FIG. 1 illustrates various components of an example of an authentication system that uses partial cookies, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a non-limiting example of components of a system that uses partial cookies (hereafter referred to as the system for 100) in which a server 110a operates. The server 110a may utilize features described in FIG. 1 to retrieve and analyze data and generate/display results. The server 110a may also use partial cookies to authenticate (or expedite the authentication of) various users. However, the system 100 is not confined to the components described herein and may include additional or other components not shown for brevity, which are to be considered within the scope of the embodiments described herein.

The server 110a may be communicatively coupled to a system database 110b, electronic devices 120a-c (generally referred to as the electronic devices 120), and an administrator computing device 140. The server 110a may also use various computer models (e.g., cookie manager 150) to generate partial cookies based on the data retrieved from the electronic devices 120. The server 110a may execute or otherwise implement any of the operations described in connection with FIGS. 2A-2B, for example, to manage and generate partial and full cookies for the electronic devices 120.

The above-mentioned components may be connected through a network 130. The examples of the network 130 may include, but are not limited to, private or public LAN, WLAN, MAN, WAN, and the Internet. The network 130 may include both wired and wireless communications according to one or more standards and/or via one or more transport mediums.

Communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The server 110a may generate and display an electronic platform configured to output the results of a profile created, generated, or otherwise processed according to the techniques described herein. The electronic platform may include one or more graphical user interfaces (GUIs) displayed on the administrator computing device 140. An example of platforms generated and hosted by the server 110a may include a web-based application or a website configured to be displayed on various electronic devices, such as mobile devices, tablets, personal computers, and the like. In a non-limiting example, the platform may be used to configure and analyze settings associated with the profile of the electronic devices 120.

The server 110a may be any computing device comprising one or more processors and non-transitory, machine-readable storage capable of executing the various tasks and processes described herein. The server 110a may employ various processors, such as a central processing unit (CPU) and graphics processing unit (GPU), among others. Non-limiting examples of such computing devices may include workstation computers, laptop computers, server computers, and the like. While the system 100 is shown as including a single server 110a, the server 110a may include any number of computing devices operating in a distributed computing environment, such as a cloud environment.

The electronic devices 120 may represent various electronic components that receive, retrieve, and/or access data needed to perform one or more transactions and facilitate authorization of accounts involving payments. Therefore, the electronic devices 120 may include various hardware and software components. For instance, the electronic devices 120 may include various devices used by a user to access an account created by the server 110a (e.g., the platform generated by the server 110a).

In another example, a client device 120b may execute an application (hosted by server 120a) to facilitate transactions and generate transaction documents and receipts. As described herein, the server 110a may also use the partial cookie to authenticate the user and facilitate a transaction.

In some embodiments, the data received from different components of the electronic devices 120 may be transmitted to the server 110a to be analyzed. The server 110a may then apply various protocols and retrieval functions discussed herein to analyze the aspects of the data to determine whether to use a full cookie or a partial cookie. For example, the server 110a can access the memory of an electronic computing device 120a to identify data structure corresponding to a partial cookie. Using the partial cookie, the server 110a may proceed with a different authentication protocol than when the server 110a identifies a full cookie.

It should be understood that any number of devices 120 may be present in the system 100. In some implementations, an electronic device 120 may include any number of end-user devices 120 (e.g., computing device, merchant device, computing system, tablet) in some implementations.

The administrator computing device 140 may represent a computing device operated by a system administrator. The administrator computing device 140 may be configured to display attributes generated by the server 110a (e.g., information received for the profile, authentication codes generated for the electronic devices 120, etc.), monitor the transactions at the electronic devices 120, and/or facilitate execution of the cookie manager 150 maintained by or accessed by (e.g., via one or more electronic circuitry, etc.) the server 110a.

In a non-limiting example, an administrator may access the platform hosted by the server 110a to monitor the detection of transactions associated with one or more devices 120, generate profiles for the one or more devices 120, access the memory of the one or more devices 120, and facilitate execution or apply the cookie manager 160.

The platform provided by the server 110a can provide the alerts generated by the server 110a. The alerts may identify one or more anomalous behaviors associated with the electronic devices 120, such as potentially fraudulent events, or other properties of the electronic devices 120 (or the components/systems thereof). The administrator may review the alerts and indicate whether they are true positive alerts or false positive alerts based on the browser sessions access by the end-user interacting with the electronic devices 120. The server 110a may monitor the end-user's interactions with the alerts.

The cookie manager 150 may represent a processor, a microcontroller, or an electronic device electrically coupled to the server 110a and the database 110b. The cookie manager 150 may be configured to generate cookies by interacting with the application, web browser, web server, or any other web-based application connected to the server 110a. The cookie manager 150 may receive an indication from the server 110a to embed, verify, and manage the cookies (e.g., partial cookie, full cookie) of the electronic devices 120. For example, the server 110a may receive a login attempt from an electronic device 120a. In response to the login attempt, the cookie manager 150 may verify the electronic computing device 120 includes a partial cookie.

In operation, the server 110a may detect, monitor, or otherwise observe the electronic devices 120. The electronic devices 120 may interact with a browser session at a first time. For example, the end-user may navigate to a web browser to purchase a subscription service or pay a bill. The server 110a may detect that the end-user navigated to the web browser and may monitor the web browser. The browser session may be a web browser (e.g., Google Chrome, Mozilla Firefox, Internet Explorer, Bing, among others) or an application that uses a plurality of user interface elements to display a window within the browser session. The window may be a website, a domain source, a webpage, or a web source that includes a plurality of text, images, interactive elements, and data input objects.

The server 110a may receive, retrieve, or obtain a request for authorization from the electronic device 120. When the end-user interacts with the web browser, the electronic device 120 may transmit the request for authorization to the server 110a. For example, to navigate to or open a window within the web browser, the end-user may select, press, or interact with an interactive element of the electronic device 120. Upon the interaction with the interactive element, the electronic device 120 may transmit the request to the server 110a. When the server 110a receives the request, the server 110a may provide, generate, or display a window within the web browser, as shown in FIG. 2A.

Figure 2A:
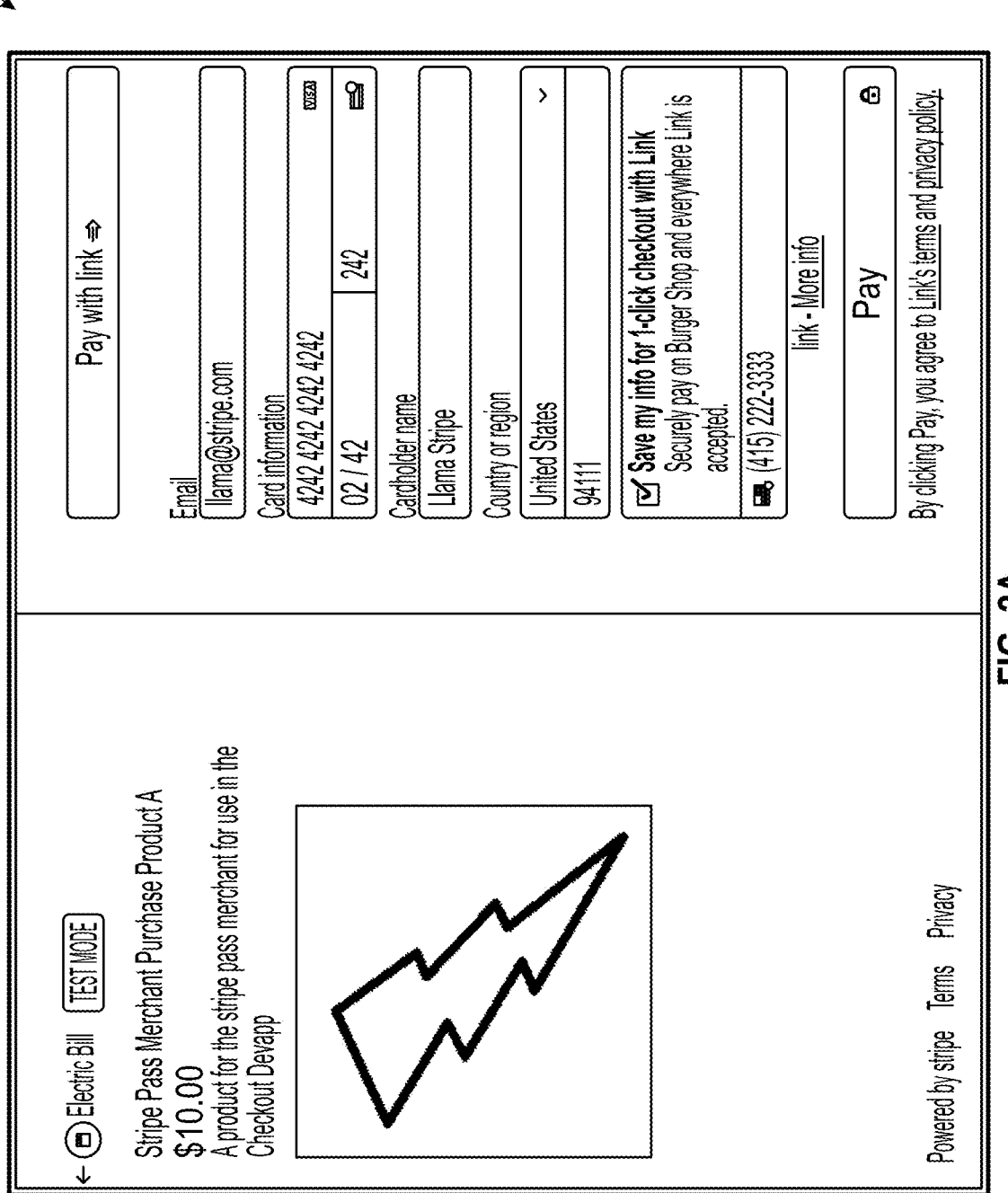
FIGS. 2A-2B illustrate example user interfaces for a first browser session and a second browser session, according to an embodiment.

Referring now to FIG. 1 and FIG. 2A, FIG. 2A, various examples of the use of partial cookies are depicted.

A user may use an electronic device (e.g., electronic device 120) to access a website depicted in FIG. 2A (browser session 200A). Before checking out, the end-user may generate an account using various input elements and input objects depicted in FIG. 2A. The input elements may include object fields for the end-user to enter, input, or provide information for the server 110a to generate a profile of the end-user described herein. The server 110a may receive authentication information associated with the end-user of the electronic device 120. The authentication information may identify, indicate, or otherwise include various forms of information associated with the end-user. The authentication information can include an electronic mail address (e-mail address), credit card information, debit card information, first name, last name, and/or a country or region associated with the end-user. For example, the end-user using the electronic device 120 may enter a first name, a last name, an email address, and a phone number into the object fields as authentication information, as depicted.

The server 110a may use the authentication information provided by the end-user to generate, create, or provide the profile for the end-user. To generate the profile, the server 110a may extract authorization information from each object field within the browser session 220A and collect the authorization information within a data structure. The data structure may be at least one of a dictionary, a map, a class, an array, an extensible markup language, or a JavaScript Object Notation. For example, the server 110a may receive a first name, a last name, and an email address for an end-user. Then, the server 110a may use the first name, last name, and email address to generate the profile of the end-user as an array.

In some embodiments, the server 110a may transmit, send, or otherwise provide the administrative computing device 140 with the profile. The profile may specify the merchant hosting the electronic device. In some embodiments, the server 110a may store the merchant of the profile within the database 110b to access when matching the browser sessions associated with the electronic devices 120. The administrative computing device 140 may adjust, change, or switch one or more configurations associated with the profile. For example, the administrator computing device 140 may add a new merchant to the profile. In some embodiments, the administrator computing device 140 may transmit an indication to the server 110a. The indication may notify the server 110a that the profile is successfully generated.

Upon the server 110a receiving the indication, in response to generating the profile, the server 110a may trigger, cause, or signal the cookie manager 150 to generate a data structure (generally referred to as a "partial cookie" herein). Concurrently, the electronic device 120 may remain within the browser session 200A while the cookie manager 150 generates the partial cookie. The partial cookie may include a reference to a data object. The data object may include limited data or information when compared to a full cookie or a standard Hypertext Transfer Protocol (HTTP) cookie. The data object may store a browser session identification (ID), end-user preferences, and browsing information. In some embodiments, the data object may be configured to store portions of the authentication information as described herein. For example, the cookie manager 150 may generate a partial cookie and store the session ID, the email address, the phone number, and the browsing history of the end-user within the data object associated with the partial cookie. The partial cookie can be a value stored within at least one of the data object, a session storage, a local storage, the database 110b, HTTP cookies, or JavaScript cookies, among others. Using aspects described herein, data object may contain portions of essential information without increasing privacy risks, wasting computing resources by storing the authentication information simply in a database, or generating the full cookie for the end-user.

In some embodiments, the cookie manager 150 may access the electronic device 120 running the browser session 200A to extract an internet protocol (IP) address, media access control (MAC) address, a device ID, the session ID, a timestamp, a geographical location, among others (generally referred to as "device information" herein). In this manner, the cookie manager 150 can generate the partial cookie specific for the electronic device 120. For example, the server 110a may generate a profile for a first end-user interacting with a smartphone 120a, concurrently, triggering the cookie manager 150 to generate the partial cookie for the first end-user interacting with the smartphone 120a. When the first end-user accesses a tablet 120b, the tablet 120b may not include the partial cookie as the partial cookie is associated with the smartphone 120a. Upon generation of the partial cookie, the server 110a may transmit, send, or otherwise provide the partial cookie to the respective electronic device 120 using the device information. In some embodiments, the cookie manager 150 may use the device information to transmit the partial cookie to the respective electronic device 120.

The partial cookie may be configured to grant access to the profile, via an authentication protocol, of the end-user associated with the webpage or the web application. For example, an electronic device 120 may access the web application during a future time period for a second time. The server 110a may trigger the cookie manager 150 to access, identify, or otherwise indicate the level of access based on the type of cookie (e.g., partial cookie or full cookie) within the electronic device 120. In this manner, the cookie manager 150 may adjust, monitor, or otherwise change the level of access to the profile based on the type of cookie (e.g., partial cookie or full cookie) at the electronic device 120. For example, prior to the server 110a providing the electronic device 120 access to the profile, the cookie manager 150 may identify a partial cookie or a full cookie located within the browser 200A or the electronic device 120. Upon identification of the partial cookie, the cookie manager 150 may assign the electronic device 120 access to the profile.

The authentication protocol may include one or more requirements to verify the end-user of the electronic device 120. For example, a requirement of the authentication protocol may identify that the end-user needs to provide a username and password to access the profile. In another example, a requirement of the authentication protocol may identify that the end-user needs to provide a code transmitted to an authorized device (e.g., electronic device 120) in the event that the electronic device 120 includes the partial cookie. In yet another example, a requirement of the authentication protocol may identify that the end-user may access the profile in the event that the electronic device 120 includes the full cookie.

In the event that the electronic device 120 does not use the partial cookie within the 365 days, the cookie manager 150 may remove, delete, or otherwise erase the partial cookie and the server 110a may delete the profile from the database 110b. For example, the electronic device 120 may not use the partial cookie for 367 days. The cookie manager 150 may delete the partial cookie. In this manner, if the electronic device 120 transmits the request for authorization and authentication information, the server 110a may use the authentication information to generate the profile.

At a second time, the server 110a may detect that the electronic device 120 accesses the webpage that previously displayed browser 200A. Since the end-user previously generated the profile, the electronic device may transmit another request for authorization to access the profile, and the server 110*a* may receive, retrieve, or otherwise obtain the request for authorization to access the profile. For example, at a first time, the electronic device 120 may access the webpage that displays browser 200A to pay an electric bill. The server 110*a* may generate the profile for the end-user of the electronic device 120 to store the information of the end-user. At a second time, the electronic device 120 may access a second browser to pay a subsequent electric bill (e.g., for the following month. The electronic device 120 may transmit the request for authorization to access the information within the profile to the server 110*a*.

When the server 110*a* receives the request for authorization to access the profile, the server 110*a* may transmit, send, or signal the cookie manager 150 to access the electronic device 120 to extract, determine, or identify the partial cookie. The partial cookie may be located within the electronic device 120 or within the browser session. In some embodiments, the server 110*a* may parse, query, or access the database to identify the profile associated with the electronic device 120. For example, responsive to the server 110*a* receiving the request for authorization to access the profile, the server 110*a* may identify the profile within the database 110*b*. From here, the server 110*a* may signal the cookie manager 150 to extract the partial cookie within the electronic device. Using this method, the system 100 can securely store and identify the presence of the partial cookie within the electronic devices 120.

Once the cookie manager 150 identifies the partial cookie, the cookie manager 150 may trigger the server 110*a* to provide a window within the browser session to verify the electronic device 120. As described above, the data object corresponding to the partial cookie may store a portion of the authentication information to decipher between different end-users of one electronic device 120. In some embodiments, the server 110*a* may recognize the end-user operating on a different electronic device 120. In some embodiments, the server 110*a* may identify the request for authorization at the first time ("first request") and identify the request to access the profile ("second request") associated with the electronic device 120. From here, the server 110*a* may identify a first attribute associated with the first request and a second attribute associated with the second request. The first attribute and the second attribute may include at least one of the geographical location of the electronic device 120, the internet protocol address of the electronic device 120, and an operating system of the electronic device 120. The server 110*a* may to identify the match between the first attribute and the second attribute. If the first attribute does not match the second attribute, the server 110*a* may transmit a notification to the electronic device 120 to indicate suspicious activity associated with the profile and execute a strict authorization protocol for the electronic device 120. The strict authorization protocol may be at least one of a multifactor authentication, a username and password, a fingerprint, one or more security questions, and the like. For example, an electronic device 120 may transmit the first request from the United States, but the second request from Argentina. In response to the difference in geographical locations, the server 110*a*, may identify suspicious activity and ask the end-user to answer one or more security questions.

Figure 2B:
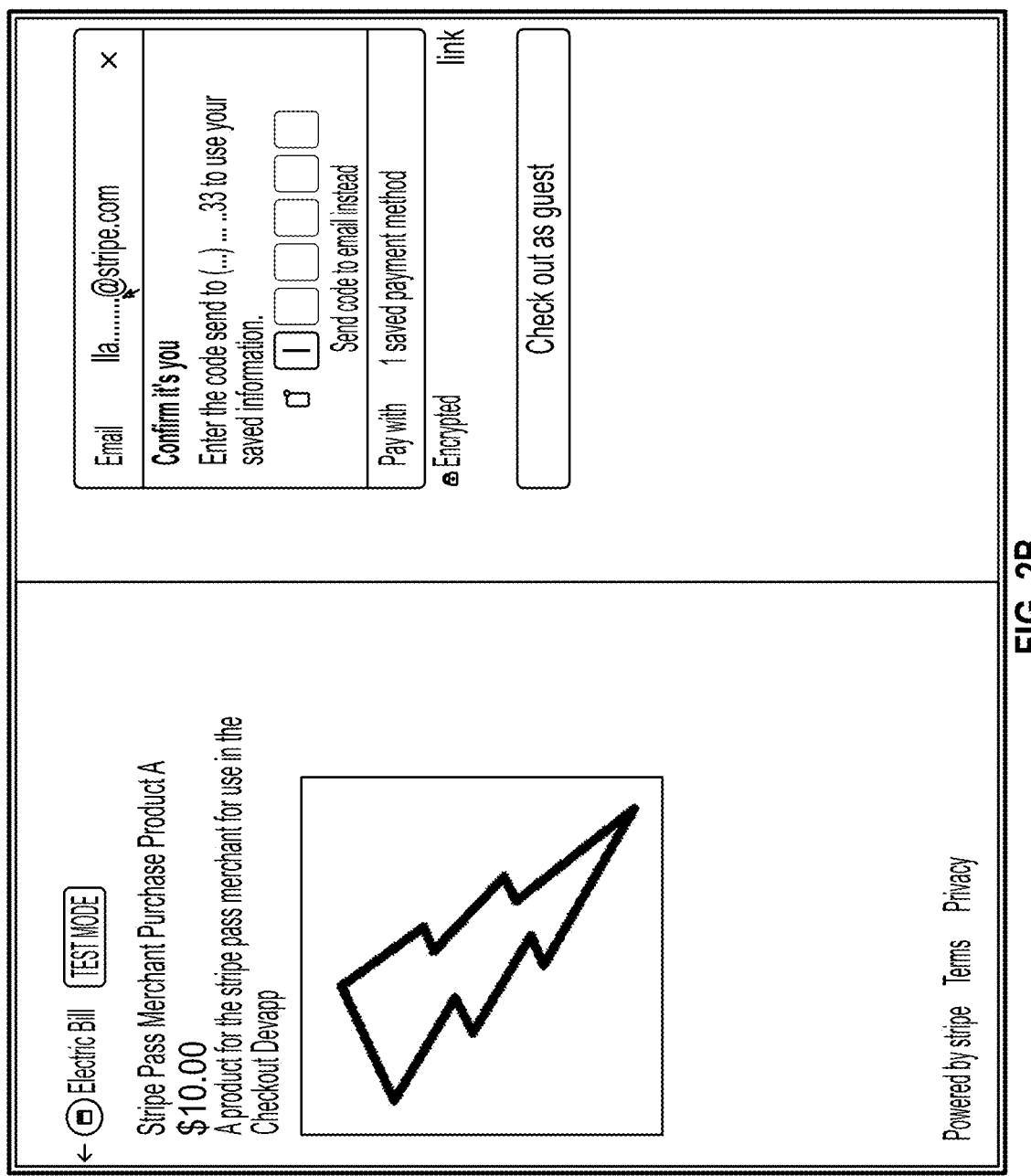

FIG. 2B depicts an example of a browser session 200B with access to the profile, via the first authentication protocol. Access to the profile may include a redacted email address or a redacted phone number, as shown in FIG. 2B. Concurrently to the server providing the browser session

200B, the server may transmit a notification to an authorized device associated with the profile. In some embodiments, the authorized device is the same as the electronic device 120. In some embodiments, the authorized device may differ from the electronic device 120.

The notification may be a short message service (SMS), a multi-media message service (MMS), an email, or a phone call, among others. The notification may include a code generated by the cookie manager 150 or the server 110*a*. The cookie manager 150 or the server 110*a* may embed the code within the notification. The code may include a plurality of alphanumeric values randomly produced by executing a randomized function. For example, the cookie manager 150 may generate the code "085653" and embed the code within the notification. In another example, the cookie manager 150 may generate the code "A834L1" and embed the code within the notification. In some embodiments, the cookie manager 150 may store the code within the database 110*b*. Using the partial cookie in this embodiment may allow the server 101*a* to prevent a second end-user from accessing the profile of a first end-user when both end-users interact with one electronic device 120 in various environments. For example, a first end-user may use a computer within a library and pay for one or more products using the system 100. If the first end user does not log out of the computer, clear the cache, or clear the browsing history, a second end-user may access the computer and access the browser session. However, by the cookie manager 150 identifying the partial cookie, the server 110*a* may transmit the notification to the authorized device (i.e., the device of the first end-user) with the code to access the profile. In this manner, the identification of the partial cookie protects the information and other sensitive data within the profile.

The end-user of the electronic device 120 may enter the code of the notification into the browser session 200B. From here, the server 110*a* may receive the code and query, match, or identify the corresponding code within the database 110*b*. For example, the server 110*a* may receive the code from the electronic device 120. Upon reception of the code, the server 110*a* may access the database 110*b* to match the received code with the code generated by the cookie manager 150.

Once the server 110*a* identifies the match, the server 110*a* may signal the cookie manager 150 to generate, create, or apply the full cookie (e.g., second data source) to grant access to the profile, via a second authentication protocol. The full cookie may allow the electronic device 120 to have access to the profile without further verification, as with the partial cookie. The full cookie may correspond to another data object. The subsequent data object may include authentication information associated with the data object of the partial cookie or may include data indicating that the user device is authorized to access an account, thereby no authentication prompt is needed. In some embodiments, the cookie manager 150 may use the partial cookie to generate the full cookie. In this manner, the full cookie may allow the electronic device 120 to access the browser without logging in or providing authentication information. Upon generation of the full cookie, the server 110*a* may transmit, send, or provide the full cookie to the electronic device 120.

In some embodiments, the end-user operating the electronic device 120 may transmit, to the server 110*a*, another request for authorization to access the profile in another browser session at a different time. The server 110*a* may receive the request and trigger the cookie manager 150 to access the electronic device 120 or the browser session 200B. From here, the cookie manager 150 may indicate, identify, or otherwise determine that the electronic device

120 includes the full cookie, similar to determining that the electronic device 120 includes the partial cookie. Upon determining that the electronic device 120 includes the full cookie, the server 110a may grant the electronic device 120 access to the profile, via the second authentication protocol, to avoid verifying the end-user again. Once the electronic device 120 includes the full cookie, the cookie manager 150 or the server 110a may maintain or store the full cookie in the database for a defined period of time (e.g., 180 days or any other time window designated by a system administrator). The server 110a may maintain a timestamp for the partial cookie and/or full cookie to maintain a record of how long the partial cookie and/or the full cookie are used.

In the event that the electronic device 120 does not use the full cookie (e.g., the server does not receive an authentication request initiated using the electronic device that has a full cookie) within the defined period of time (e.g., 180 days), the cookie manager 150 may demote, revert, or change the full cookie to the partial cookie. For example, the electronic device 120 may not use the full cookie for 181 days. The cookie manager 150 may revert the full cookie into the partial cookie. In this manner, if the electronic device 120 transmits the request for authorization to the profile, the server 110a may provide browser 200B and generate the code within the notification to access the profile. This, the end-user may have to reverify the electronic device 120 to access the profile.

In some embodiments, a full cookie that is expired may be treated as a partial cookie. For instance, when the server 110a receives an authentication request from a device, the server 110a determines that the device has a full cookie. The server 110a may then determine a last time that the device was used to access a profile. If the access (e.g., login date) satisfies a threshold, then the full cookie is considered to be active and the server 110a may execute an authentication profile that is lighter (e.g., more in tune with assuming that the device is trusted and allowing the device to access the profile via minimal authentication requirements). However, if the cookie is considered to be expired (e.g., the last login date is older than the threshold), the server 110a may treat the full cookie as a partial cookie. The user must then go through various authentication protocols with respect to having a partial cookie.

In some embodiments, the electronic device 120 may transmit a third request (e.g., request to access the profile for a second time) to the server 110a. The third request may indicate that the electronic device 120 includes the full cookie. Upon reception of the third request, the server 110a may identify a second request (i.e., request to access the profile for a second time), associated with the electronic device 120, from the database 110b. From here, the server 110a may identify a first attribute associated with the second request and a second attribute associated with the third request. The first attribute and the second attribute may include at least one of the geographical location of the electronic device 120, the internet protocol address of the electronic device 120, and an operating system of the electronic device 120. The server 110a may to identify the match between the first attribute and the second attribute. If the first attribute does not match the second attribute, the server 110a may transmit a notification to the electronic device 120 to indicate suspicious activity associated with the profile and trigger the cookie manager 150 to revoke the full cookie of the electronic device 120 and transmit the partial cookie to the electronic device 120 to secure the profile of the end-user. For instance, an electronic device 120 may transmit the first request from the United States, but the second request from India. In response to the difference in geographical locations the server 110a may identify suspicious activity and trigger the cookie manager 150 to revoke the full cookie and transmit a partial cookie to the electronic device 120.

Figure 3:
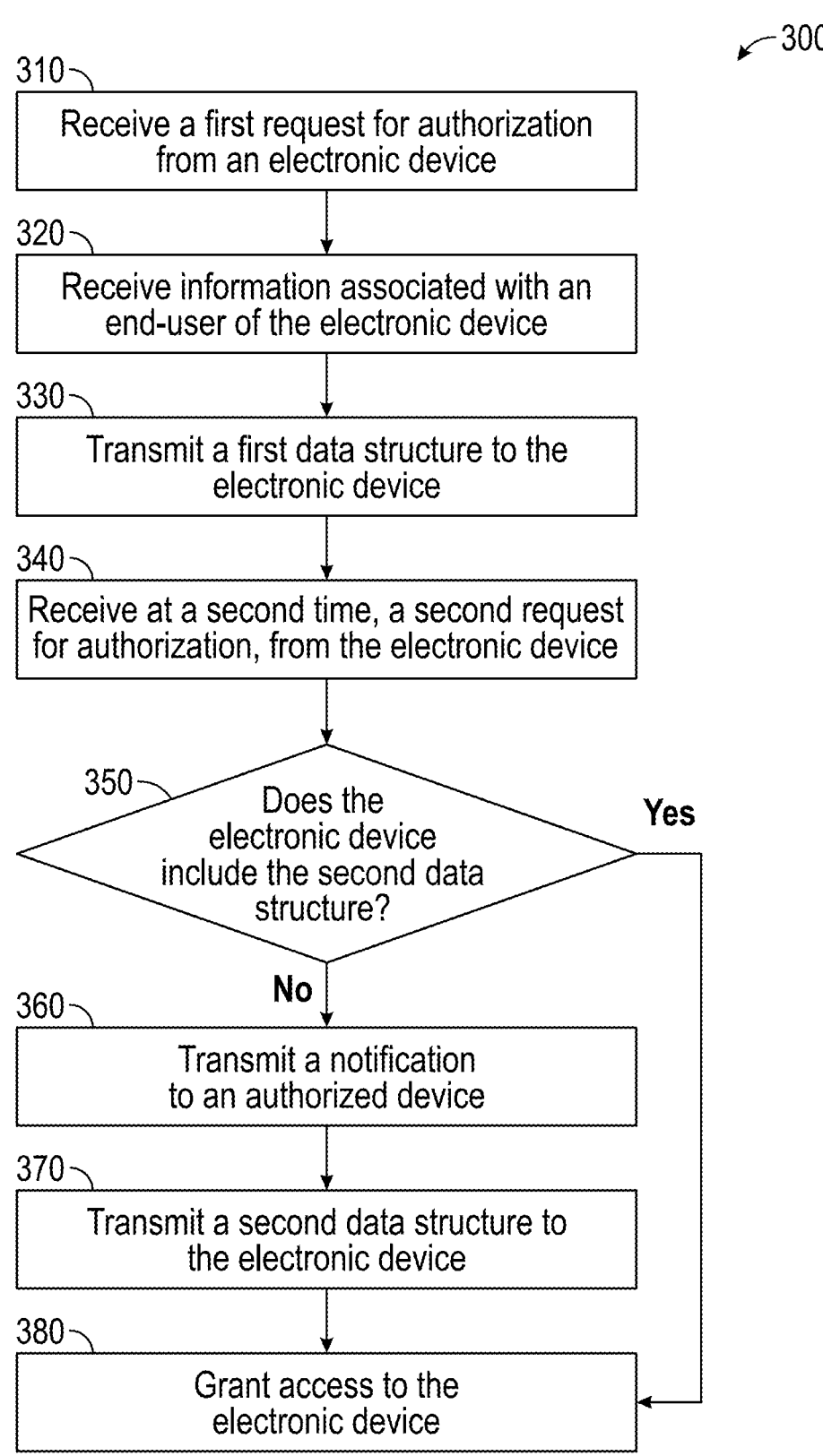
FIG. 3 illustrates a flow diagram of a process using partial cookies for authentication, according to an embodiment.

FIG. 3 illustrates a flow diagram of a process executed in a partial cookie system, according to an embodiment. The method 300 includes steps 310-380. However, other embodiments may include additional or alternative execution steps, or may omit one or more steps altogether. The method 300 is described as being executed by a server, similar to the server described in FIG. 1. However, one or more steps of method 300 may also be executed by any number of computing devices operating in the distributed computing system described in FIG. 1. For instance, one or more computing devices (e.g., user devices) may locally perform some or all of the steps described in FIG. 3.

At step 310, the server (e.g., server 110a) may receive, in a first browser session at the first time, a first request for authorization from the electronic device (e.g., electronic devices 120a-c). The first browser session may include a window to provide one or more data input objects for the end user to enter information. The first request may access the window within the browser session, register the electronic device for the browser session, or log in to the browser session.

The server may receive an indication that a user operating a user device and a browser session has requested for authorization to access a set of data records. In a non-limiting embodiment, the server may receive (from the user device at a first time) a request to generate an account, such as a payment account or the like.

At step 320, the server may receive authentication information associated with an end-user of the electronic device. The end-user may enter the authentication information within the data input objects. Using the authentication information to generate a profile for the end-user. The profile can include at least one of an electronic mail address, credit card information, debit card information, a cardholder name, a phone number, and a region.

Upon receiving the request, the server may display various prompts configured to receive account information from the user, such as user's information, username, password, and the like.

At step 330, a cookie manager (e.g., cookie manager 150) may transmit a first data structure (e.g., partial cookie) to the electronic device during the first browser session and prior to receiving the authentication information again. Prior to transmitting the partial cookie, the cookie manager may generate the partial cookie to grant access to the profile, via a first authentication protocol, during the first browser session. The partial cookie may grant access for a defined period of time, such as 365 days.

Upon the server generating an account for the user (using the information received in the step 320), the server may then generate and transmit a partial cookie to the user device. The partial cookie may indicate that the user device is partially authenticated or partially trusted. As opposed to a full cookie that grants automatic access to the user profile and indicates that the user device is trusted, a partial cookie may indicate that the user device is partially trusted. When the server determines that a user device includes a partial cookie, the server may execute a lighter authentication protocol that includes fewer authentication prompts. For instance, if a user device does not have any cookies, the server may execute a full authentication protocol because the device is completely unknown. For instance, the server may require the user to input a username and password before granting access to the profile. If the user device includes a full cookie, the server may execute the lightest authentication protocol (e.g., automatically grant access to the user device) because the device is completely trusted by the server. However, if the server determines that a device includes a partial cookie, the server may execute a partial authentication protocol.

A partial authentication protocol may include an authentication protocol with fewer authentication prompts. For instance, a username of the account may be pre-filled by the server. In another non-limiting example, the server may transmit a second-factor authentication to a trusted device associated with the partial cookie (the user device that includes the partial cookie).

In some embodiments, the server may transmit the data structure to the electronic device upon generation of the profile and without the need for the user to perform any additional actions. For instance, some conventional methods may prompt the user to log in to the newly generated account before transmitting a full cookie. However, this requires the user to provide authentication information (username and password) at least twice. However, in the embodiment described herein, the server may transmit the partial cookie (data structure) after the generation of the account. In this way, the user device that was used to generate the account/profile can have easier access to the profile in future cases.

At step 340, the server may receive, during a second browser session at a second time, a second request for authorization to access the profile from the electronic device. The server may receive a request to access the profile generated by the server (step 320).

At step 350, the cookie manager may determine if the electronic device includes the full cookie. The cookie manager may determine that the electronic device includes the full cookie by retrieving the full cookie from the memory of the electronic device. If the cookie manager retrieves the full cookie from memory of the electronic device, the method 300 proceeds to step 360. Otherwise, the method 300 proceeds to step 380 as the cookie manager successfully retrieved the full cookie from the memory of the electronic device.

At step 360, the server may transmit a notification to an authorized device. The cookie manager may embed a code within the notification. The code may include a plurality of alphanumeric values. When the server determines that the user device includes a partial cookie, the server executes a partial authentication protocol in which the server identifies a trusted device associated with the user profile and transmits a notification to the trusted device. The server may then use a two factor authentication protocol using the trusted device. For instance, the server may transmit a secret code to the trusted device and request the user device (having the partial cookie) to input the code.

At step 370, the cookie manager may transmit a second data source (e.g., full cookie) to the electronic device in response to the electronic device replying to the notification.

At step 380, the server may grant access of the profile to the electronic device, via a second authentication protocol (e.g., two factor authentication, username and password, fingerprint, etc.). The server may receive, during a third browser session at a third time, a third request for authorization to access the profile from the electronic device. The cookie manager may determine that the electronic device includes the full cookie. In response to the determination that the electronic device includes the full cookie, the cookie manager may grant access to the profile, via the second authentication information.

In some embodiments, the server may identify a first attribute associated with the second request and a second attribute associated with a third request. When the first attribute does not match the second attribute, the server may transmit a second notification to the electronic device indicating suspicious activity associated with the profile.

In a first example, an end-user may use a cell phone (e.g., electric device 120a) to purchase a product via a web browser from an online store, a domain source, and the like. To purchase the product, the end-user may enter payment information (e.g., credit card information, first name, last name, phone number) for the product; the end-user may register on the web browser to generate a profile. A server (e.g., server 110a) may receive the payment information and generate a profile for the end-user. The server may store the profile in a database (e.g., database 110b) and trigger a processor (e.g., cookie manager 150) to generate a partial cookie. The partial cookie may identify the end-user without verifying the end-user. After a few days, the end-user may return to the web browser to purchase a second product. The cookie manager may access the electronic devices to find the previously provided partial cookie. If the partial cookie is identified, the web browser may show a redacted phone number to identify the end user. The server may also transmit a notification to an authorized device to verify the end user. The notification may include a six-digit code. Once the end-user enters code into the web-browser, the cookie manager may generate a full cookie and the server may transmit the full cookie to the end-user to securely access the payment information. In this manner, the end-user may no longer sign in or register to use the payment information, as the full cookie may bypass these steps.

In a second example, an end-user may use a cell phone (e.g., electric device 120a) to purchase a product from a web browser, an online store, a domain source, and the like. To store payment information (e.g., credit card information, first name, last name, phone number) for the product, the end-user may register on the web browser to generate a profile. A server (e.g., server 110a) may receive the payment information and generate a profile for the end-user. The server may store the profile in a database (e.g., database 110b) and trigger a processor (e.g., cookie manager 150) to generate a partial cookie. The partial cookie may identify the end-user without verifying the end-user. After a few days, the end-user may return to the web browser to purchase a second product. The cookie manager may access the electronic devices to find the previously provided partial cookie. If the partial cookie is located, the web browser may show a redacted phone number to identify the end-user, but transmit a notification to an authorized device to verify the end-user. The notification may include a 6-digit code. Once the end-user enters code into the web-browser, the cookie manager may generate a full cookie and the server may transmit the full cookie to the end-user to securely access the payment information. In this manner, the end-user may no longer sign in or register to use the payment information, as the full cookie may bypass these steps. If the end-user does not access the web browser for 180 days, the cookie manager may revert the full cookie into a partial cookie to require the end-user to re-verify themselves using a partial authentication protocol instead. In this manner, the system can save computing resources by maintaining the partial cookie for up to 365 days to identify the end user. This approach may be beneficial because it is much cheaper to maintain and save the partial cookie than to remove all access to the payment information and then require the end-user to register the payment information again.

Figure 4:
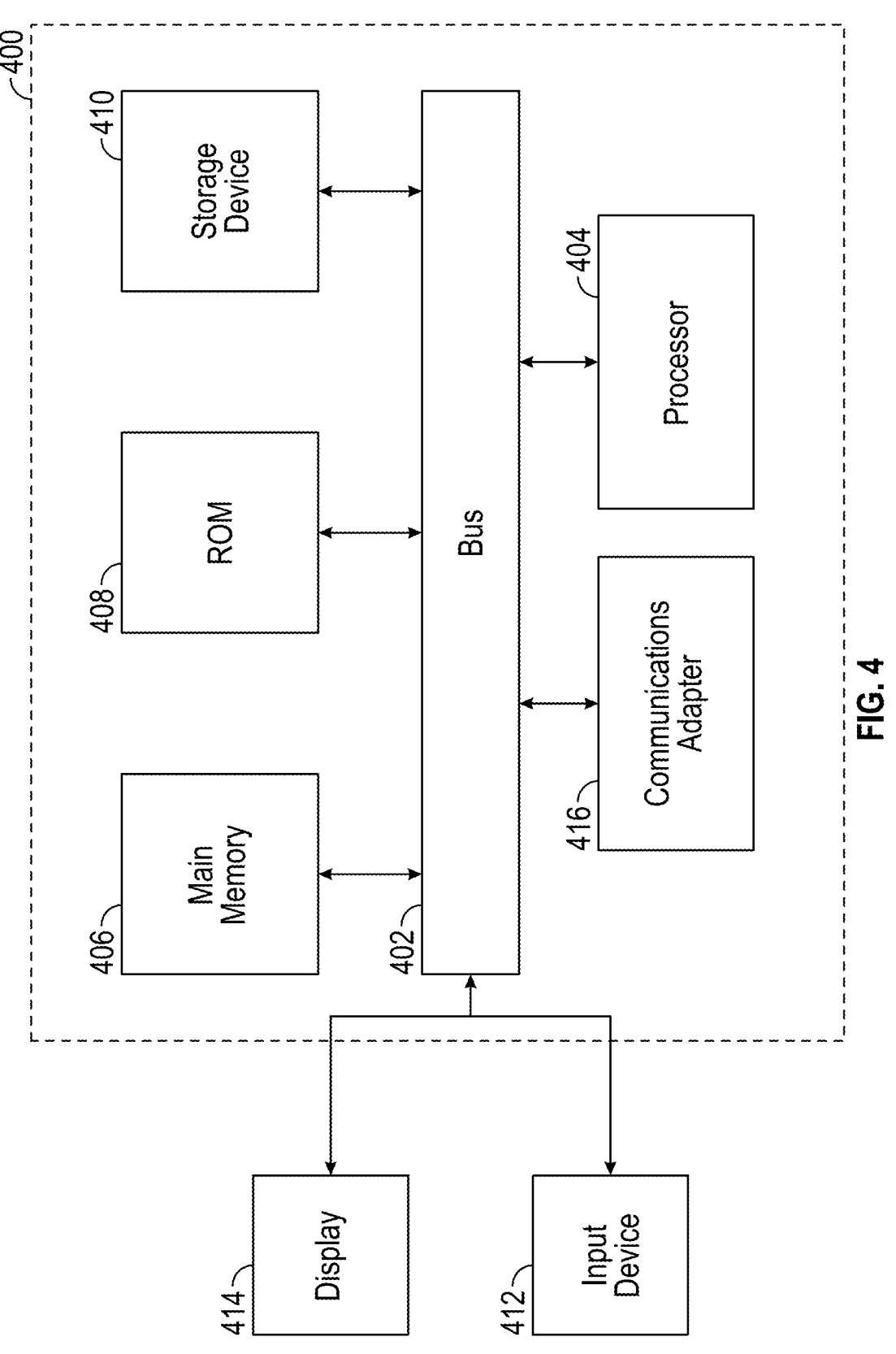
FIG. 4 illustrates a component diagram of a computing system suitable for use in the various implementations described herein, according to an embodiment.

FIG. 4 is a component diagram of an example computing system suitable for use in the various implementations described herein, according to an example implementation. One or more steps of the methods and processes discussed herein can be performed by the computing system depicted in FIG. 4.

The computing system 400 includes a bus 402 or other communication component for communicating information and a processor 404 coupled to the bus 402 for processing information. The computing system 400 also includes main memory 406, such as a RAM or other dynamic storage device, coupled to the bus 402 for storing information, and instructions to be executed by the processor 404. Main memory 406 can also be used for storing position information, temporary variables, or other intermediate information during the execution of instructions by the processor 404. The computing system 400 may further include a ROM 408 or other static storage device coupled to the bus 402 for storing static information and instructions for the processor 404. A storage device 410, such as a solid-state device, magnetic disk, or optical disk, is coupled to the bus 402 for persistently storing information and instructions.

The computing system 400 may be coupled via the bus 402 to a display 414, such as a liquid crystal display, or active-matrix display, for displaying information to a user. An input device 412, such as a keyboard including alphanumeric and other keys, may be coupled to the bus 402 for communicating information, and command selections to the processor 404. In another implementation, the input device 412 has a touch screen display. The input device 412 can include any type of biometric sensor, or a cursor control, such as a mouse, a trackball, or cursor direction keys, for communicating direction information and command selections to the processor 404 and for controlling cursor movement on the display 414.

In some implementations, the computing system 400 may include a communications adapter 416, such as a networking adapter. Communications adapter 416 may be coupled to bus 402 and may be configured to enable communications with a computing or communications network or other computing systems. In various illustrative implementations, any type of networking configuration may be achieved using communications adapter 416, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 400 in response to the processor 404 executing an implementation of instructions contained in main memory 406. Such instructions can be read into main memory 406 from another computer-readable medium, such as the storage device 410. Execution of the implementation of instructions contained in main memory 406 causes the computing system 400 to perform the illustrative processes described herein. One or more processors in a multi-processing implementation may also be employed to execute the instructions contained in main memory 406. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating the achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored or otherwise accessed via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special-purpose computer, or special-purpose processing machine to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device, including, but not limited to, a keyboard, a keypad, a mouse, a joystick, or other input devices performing a similar function. Comparatively, the term "output device," as described herein, may include any type of output device, including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on the designer's choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

In certain circumstances, multitasking and parallel processing may be advantageous. Moreover, the separation of various system components in the implementations described above should not be understood as requiring such separation in all implementations, and it should be understood that the described program components and systems can generally be integrated together into a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementations," "one implementation," or the like are not necessarily mutually exclusive and are intended to indicate that a particular feature, structure, or characteristic described in connection with the implementation may be included in at least one implementation. Such terms, as used herein, are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions, and implementation of the implementations without departing from the scope of the present disclosure as expressed in the appended claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A system, comprising:
one or more processors coupled to non-transitory memory, the one or more processors configured to:
  receive, during a first browser session at a first time, a first request for authorization from an electronic device;
  receive authentication information associated with an end-user of the electronic device;
  responsive to generating a profile for the end-user using the authentication information, during the first browser session and prior to receiving the authentication information again, transmit, to the electronic device, a first data source configured to grant a first level of access to the profile via a first authentication protocol, wherein the first level of access grants partial access to the profile;
  receive, at a second browser session at a second time, from the electronic device, a second request for authorization to access the profile;
  identify a first attribute associated with the second request;
  responsive to a determination that the electronic device includes the first data source, transmit a first notification to an authorized device associated with the profile;
  upon receiving a response to the first notification that the electronic device has been successfully authenticated, transmit, to the electronic device, a second data source configured to grant a second level of access to the profile via a second authentication protocol having fewer authentication prompts than the first authentication protocol, wherein the second level of access grants full access to the profile;
  receive, at a third browser session at a third time, from the electronic device, a third request for authorization to access the profile;
  identify a second attribute associated with the third request;
  when the first attribute does not match the second attribute, transmit a second notification to the electronic device indicating suspicious activity associated with the profile; and
  upon determining that the electronic device includes the second data source and receiving a response to the second notification, grant full access to the profile via the second authentication protocol.

2. The system of claim 1, wherein the one or more processors are further configured to:

generate the profile to store the authentication information associated with the end-user of the electronic device; and generate the first data source to grant partial access to the profile during the first browser session via the first authentication protocol.

3. The system of claim 1, wherein the first data source or the second data source is configured to grant partial or full access to the profile for a defined period of time.

4. The system of claim 1, wherein the one or more processors are further configured to embed a code within the first notification, the code including a plurality of alphanumeric values.

5. The system of claim 1, wherein the authentication information comprises at least one of an electronic mail address, credit card information, debit card information, a cardholder name, a phone number, or a region.

6. The system of claim 1, wherein the one or more processors are further configured to:

when the first attribute does not match the second attribute, revoke the second data source.

7. The system of claim 1, wherein the first attribute or the second attribute is one of at least a geographical location, an internet protocol address of the electronic device, or an operating system of the electronic device.

8. The system of claim 1, wherein the one or more processors are further configured to determine that the electronic device includes the first data source by retrieving the first data source from memory of the electronic device.

9. A method, comprising:

receiving, by one or more processors during a first browser session at a first time, a first request for authorization from an electronic device;

receiving, by the one or more processors, authentication information associated with an end-user of the electronic device;

responsive to generating a profile for the end-user using the authentication information, during the first browser session and prior to receiving the authentication information again, transmitting, by the one or more processors, to the electronic device a first data source configured to grant a first level of access to the profile via a first authentication protocol, wherein the first level of access grants partial access to the profile;

receiving, by the one or more processors, at a second browser session at a second time, from the electronic device, a second request for authorization to access the profile;

identifying, by the one or more processors, a first attribute associated with the second request;

responsive to a determination that the electronic device includes the first data source, transmitting, by the one or more processors, a first notification to an authorized device associated with the profile;

upon receiving a response to the first notification that the electronic device has been successfully authenticated, transmitting, by the one or more processors, to the electronic device a second data source configured to grant a second level of access to the profile via a second authentication protocol having fewer authentication prompts than the first authentication protocol, wherein the second level of access grants full access to the profile;

receiving, by the one or more processors at a third browser session at a third time, from the electronic device, a third request for authorization to access the profile;

identifying, by the one or more processors, a second attribute associated with the third request; when the first attribute does not match the second attribute, transmitting, by the one or more processors, a second notification to the electronic device indicating suspicious activity associated with the profile; and upon determining that the electronic device includes the second data source and receiving a response to the second notification, granting, by the one or more processors, full access to the profile via the second authentication protocol.

10. The method of claim 9, further comprising:

generating, by the one or more processors, the profile to store the authentication information associated with the end-user of the electronic device; and generating, by the one or more processors, the first data source to grant partial access to the profile during the first browser session, via the first authentication protocol.

11. The method of claim 9, wherein the first data source or the second data source is configured to grant partial or full access to the profile for a defined period of time.

12. The method of claim 9, wherein transmitting the first notification to the authorized device further comprises embedding, by the one or more processors, a code within the first notification, the code including a plurality of alphanumeric values.

13. The method of claim 9, wherein the authentication information comprises at least one of an electronic mail address, credit card information, debit card information, a cardholder name, a phone number, and a region.

14. The method of claim 9, further comprising:

when the first attribute does not match the second attribute, revoking, by the one or more processors, the second data source.

15. The method of claim 9, wherein the first attribute or the second attribute is one of at least a geographical location, internet protocol address of the electronic device, or an operating system of the electronic device.

16. The method of claim 9, further comprising determining, by the one or more processors, that the electronic device includes the first data source.

* * * * *